US012738565B2

(12) United States Patent
Ishikawa et al.

(10) Patent No.: US 12,738,565 B2
(45) Date of Patent: Sep. 15, 2026

(54) COOLING STRUCTURE FOR BATTERY MODULES

(71) Applicant: SUBARU CORPORATION, Tokyo (JP)

(72) Inventors: Tatsuya Ishikawa, Tokyo (JP); Shinichi Kimura, Tokyo (JP)

(73) Assignee: Subaru Corporation, Tokyo (JP)

(*) Notice: Subject to any disclaimer, the term of this patent is extended or adjusted under 35 U.S.C. 154(b) by 541 days.

(21) Appl. No.: 18/234,351

(22) Filed: Aug. 15, 2023

(65) Prior Publication Data

US 2024/0088478 A1 Mar. 14, 2024

(30) Foreign Application Priority Data

Sep. 8, 2022 (JP) ................................ 2022-143176

(51) Int. Cl.

*H01M 10/6557* (2014.01)
*H01M 10/613* (2014.01)
*H01M 10/625* (2014.01)
*H01M 10/647* (2014.01)
*H01M 10/6556* (2014.01)
*H01M 10/6563* (2014.01)

(52) U.S. Cl.

CPC ..... *H01M 10/6557* (2015.04); *H01M 10/613* (2015.04); *H01M 10/625* (2015.04); *H01M 10/647* (2015.04); *H01M 10/6556* (2015.04); *H01M 10/6563* (2015.04)

(58) Field of Classification Search

None

See application file for complete search history.

(56) References Cited

U.S. PATENT DOCUMENTS

2014/0302371 A1* 10/2014 Miyawaki ......... H01M 10/6557 429/120
2020/0321666 A1* 10/2020 Kim .................. H01M 10/6557
2021/0107378 A1* 4/2021 Hirsch ................ H01M 10/613

FOREIGN PATENT DOCUMENTS

JP 2010-244877 A 10/2010

* cited by examiner

*Primary Examiner* — Gregg Cantelmo

(74) *Attorney, Agent, or Firm* — McGinn IP Law Group, PLLC

(57) ABSTRACT

A cooling structure includes battery modules including battery cells, an intake duct allowing cooling air to flow to the battery modules, and a chamber communicating with the intake duct. The chamber is interposed between the adjacent battery modules. The chamber includes a body, sealing members, and a reinforcing rib. The body has a box shape and includes openings at both ends in an arrangement direction of the battery modules, and communicates with each battery module. Each sealing member is disposed at a coupling area. The reinforcing rib is provided in an internal space of the body and coupled to first and second parts of the body apart from each other in a height direction of the body. The reinforcing rib extends between the first and second parts. The body is supported with being held between the battery modules. The cooling air is sent to the battery modules via the chamber.

19 Claims, 5 Drawing Sheets

COOLING STRUCTURE FOR BATTERY MODULES

CROSS-REFERENCE TO RELATED APPLICATIONS

The present application claims priority from Japanese Patent Application No. 2022-143176 filed on Sep. 8, 2022, the entire contents of which are hereby incorporated by reference.

BACKGROUND

The disclosure relates to a cooling structure for battery modules.

Existing cooling structures for battery packs include a structure disclosed in Japanese Unexamined Patent Application Publication (JP-A) No. 2010-244877, for example.

A battery pack includes battery stacks that are arranged in a direction perpendicular to a direction of stacking battery cells in the battery stacks. The battery pack includes a case frame serving as a frame body enclosing the battery pack.

A cooling structure of the battery pack is provided in a space between adjacent battery stacks or between sides of the battery stacks. In one example, the battery stacks are placed on an upper surface of a beam of the case frame. A fin and a flange are integrally formed with the beam into one body and are disposed in the space between the sides of the battery stacks.

This space is defined into an intake passage and a discharge passage by the fin that straightly extends from the beam to an upper side. Cooling air is supplied to one of the adjacent battery stacks via the intake passage. Meanwhile, cooling air that passes through the other one of the adjacent battery stacks is discharged to the outside of the battery pack via the discharge passage.

SUMMARY

An aspect of the disclosure provides a cooling structure for battery modules. The cooling structure includes battery modules, an intake duct, and a chamber. The battery modules includes battery cells. The intake duct is configured to allow cooling air to flow to the battery modules. The chamber communicates with the intake duct. The chamber is interposed between the battery modules that are adjacent to each other. The chamber includes a body, sealing members, and a reinforcing rib. The body has a box shape and includes openings respectively at both ends in an arrangement direction in which the battery modules are arranged. The body communicates with each of the battery modules. Each of the sealing members is disposed at a coupling area at which the body and a corresponding one of the battery modules are coupled to each other. The at least one reinforcing rib is provided in an internal space of the body. The reinforcing rib is coupled to first and second parts of the body that are apart from each other in a height direction of the body. The reinforcing rib extends between the first and second parts of the body. The body is supported in a state of being held between the battery modules. The cooling air is sent to the battery modules via the chamber.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
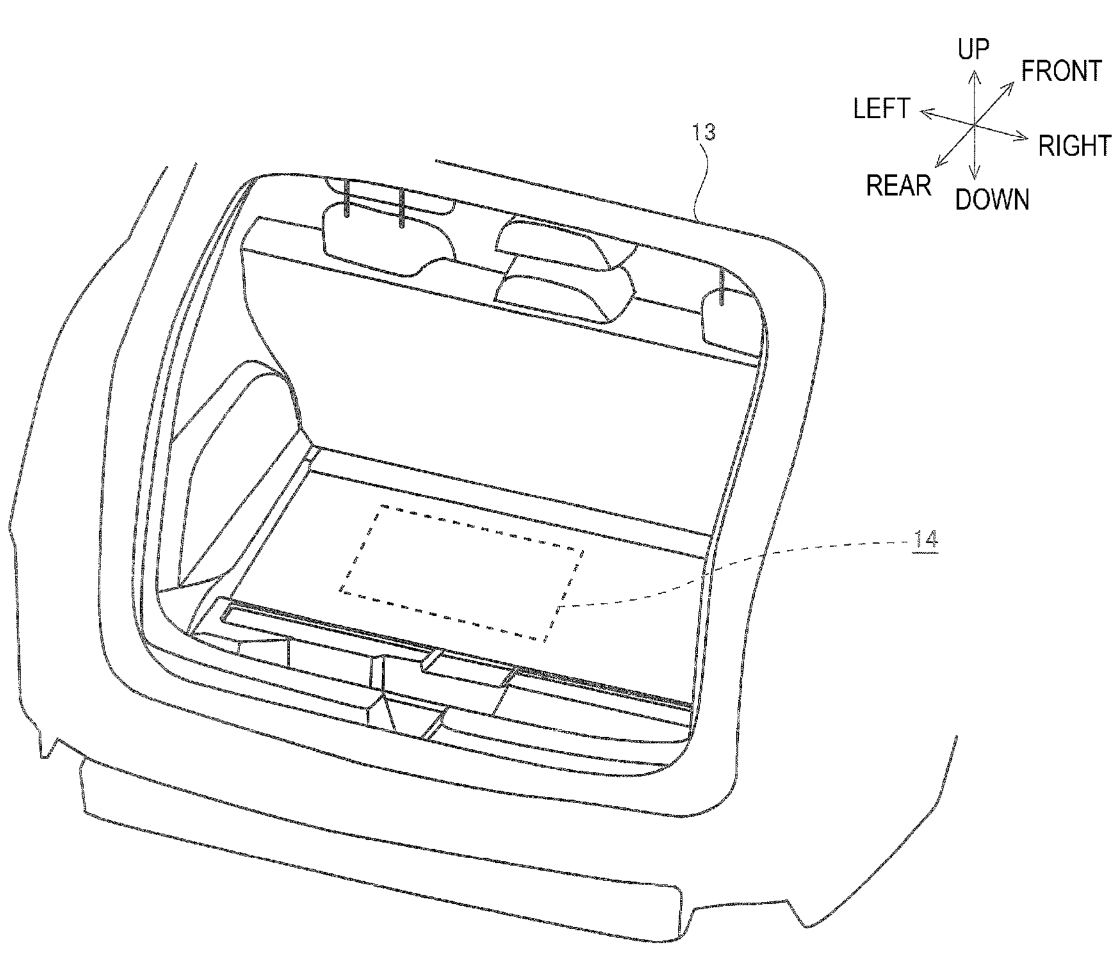
FIG. 1 is a perspective view of a vehicle mounted with a battery pack having a cooling structure for battery modules of an embodiment of the disclosure.

In the cooling structure of the battery pack disclosed in JP-A No. 2010-244877, the fin and the flange are disposed in the space between the sides of the battery stacks. The space on a top surface side is sealed by the flange, and the space on a bottom surface side is sealed by the beam. The fin and the flange form an approximately T shape in a sectional view and extend in a longer direction of the battery stacks.

The structure that uses the fin and the flange tends to have an insufficient rigidity due to its cross sectional shape, if they are made of a certain material, such as resin. The fin and the flange are likely to be deflected or distorted, for example, by receiving vibrations during traveling of a vehicle or by receiving stress from the side of the battery stack due to the vibrations. As a result, the flange is deviated from the position at which it is fixed in assembling, which can cause insufficient sealing at the space. Insufficient sealing can cause cooling air to leak to the outside of the space, resulting in insufficient cooling of the battery stacks.

The case frame has a fixing frame that is disposed so as to face the beam. The fixing frame is disposed above the space and presses the battery stacks to a lower frame of the frame body, whereby the battery stacks are fixed to the case frame. A stuck bolt that constitutes the fixing frame is fixed to the flange by welding.

In the battery pack having this structure, the number of components and the assembling steps are increased due to the fixing frame, which increase manufacturing cost and mass of the whole battery pack.

In the existing cooling structure, the space is defined into the intake passage and the discharge passage by the fin, and the adjacent battery stacks are spatially separated. This structure reduces a cross sectional area of an air passage, and depending on the flow direction of cooling air, it may be difficult to uniformly supply cooling air to the whole battery stacks, which can generate an excessively heated part. In view of this, in order to solve these drawbacks, the intake passage and the discharge passage may be combined together to widen the cross section of the air passage. However, the fin is also used to support the flange to which the stuck bolt is welded. For this reason, the structure from which the fin is simply omitted is incapable of supporting the flange and has another problem in which rigidities of the case frame itself and the cooling structure are reduced.

It is desirable to provide a cooling structure for battery modules, in which a chamber is interposed between adjacent battery modules and supplies cooling air from a cooling duct to the battery module on each side thereof.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A cooling structure 10 for battery modules 11 according to the embodiment of the disclosure will be described in detail based on the drawings. The front-rear direction illustrated on the paper represents a width direction in a shorter direction of the battery module 11, the right-left direction illustrated on the paper represents a width direction in a longer direction of the battery module 11, and the up-down direction illustrated on the paper represents a width direction in a height direction of the battery module 11.

Figure 2:
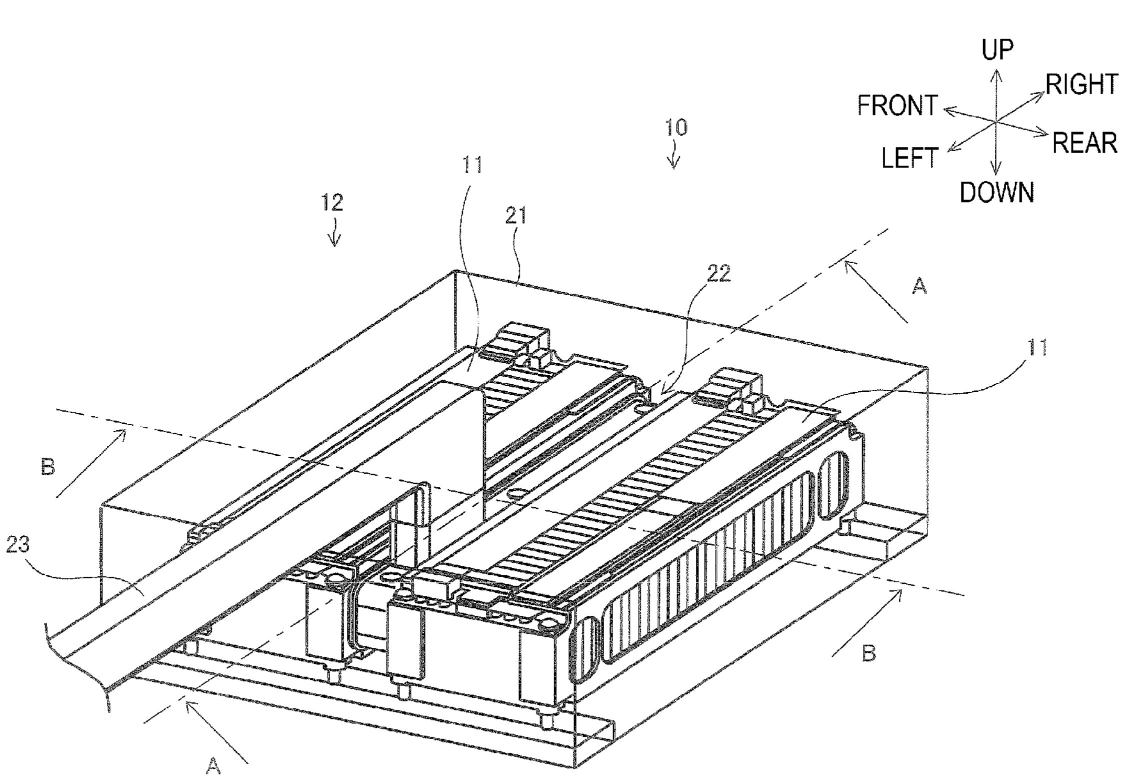
FIG. 2 is a perspective view of the battery pack having the cooling structure for the battery modules of the embodiment of the disclosure.
Figure 3:
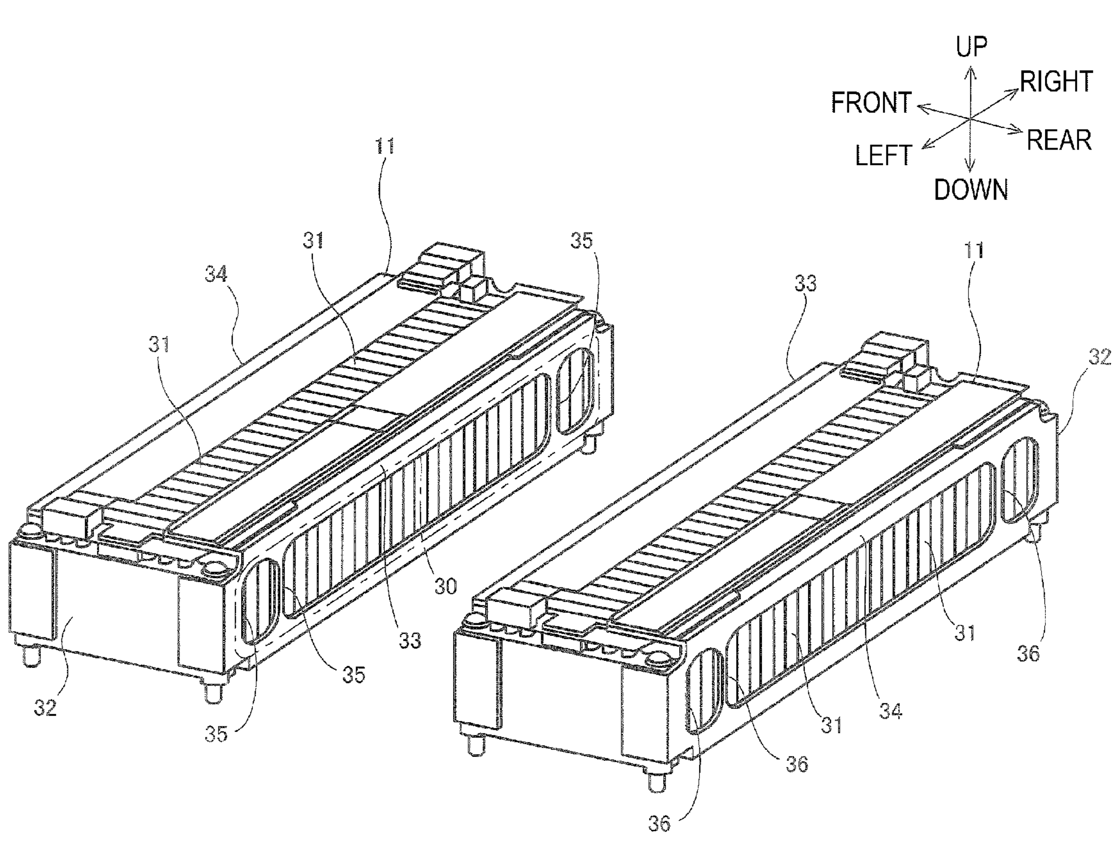
FIG. 3 is a perspective view of the battery modules used in the cooling structure for the battery modules of the embodiment of the disclosure.
Figure 4A:
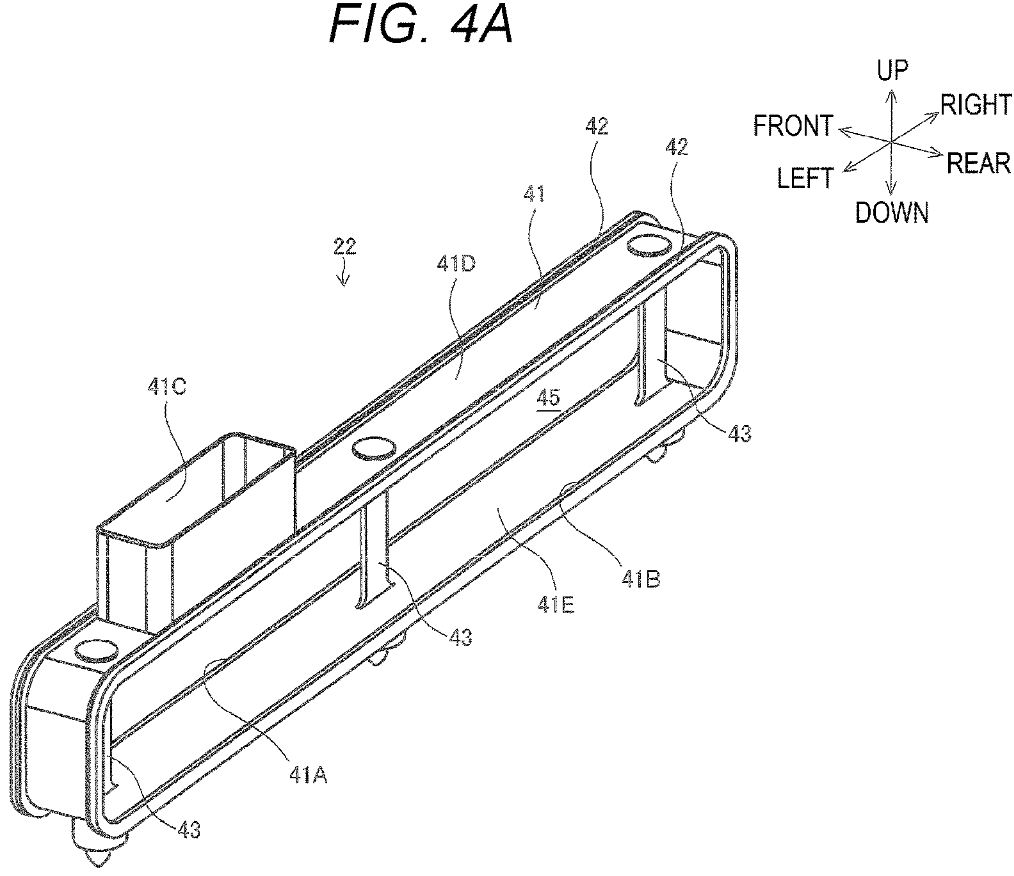
FIG. 4A is a perspective view of a chamber used in the cooling structure for the battery modules of the embodiment of the disclosure.
Figure 4B:
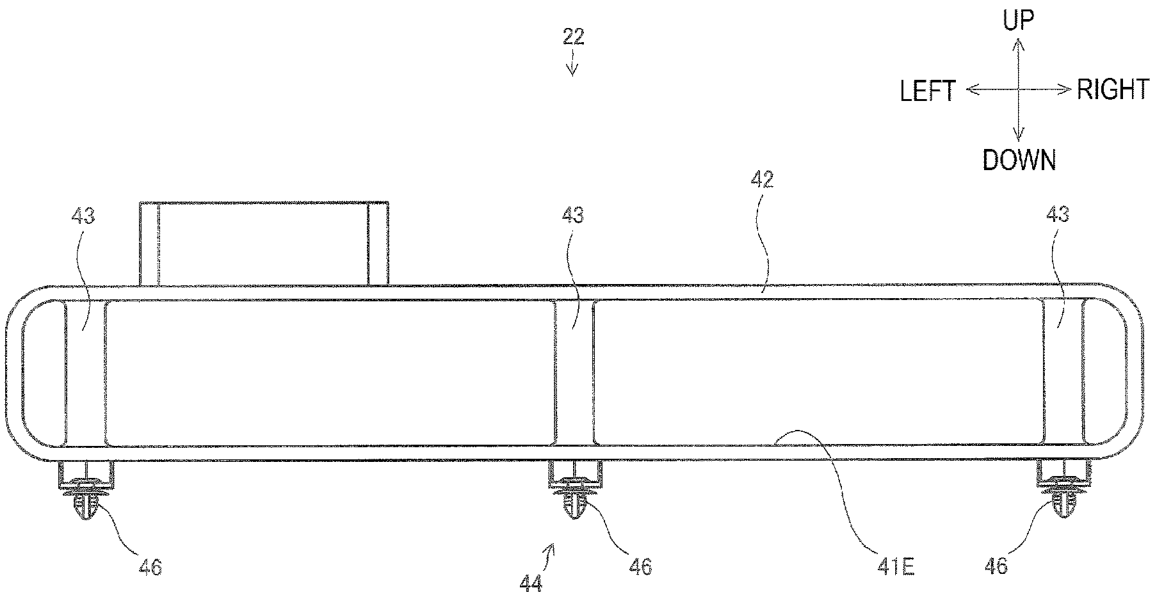
FIG. 4B is a side view of the chamber used in the cooling structure for the battery modules of the embodiment of the disclosure.
Figure 5A:
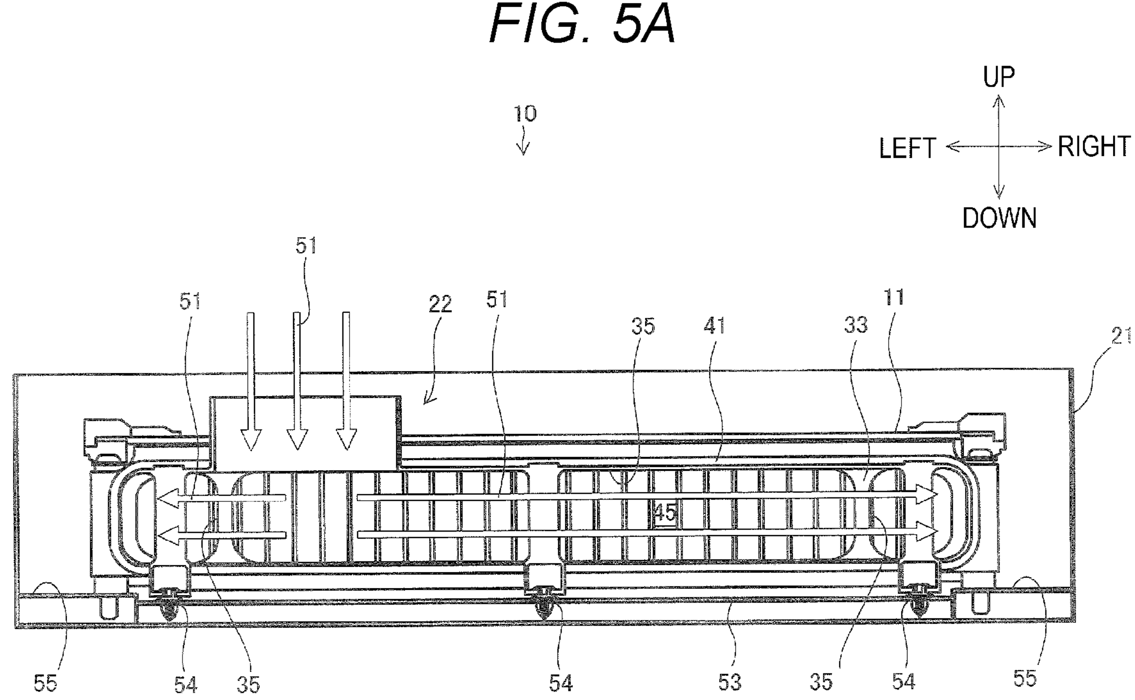
FIG. 5A is a sectional view of the battery modules used in the cooling structure for the battery modules of the embodiment of the disclosure.
Figure 5B:
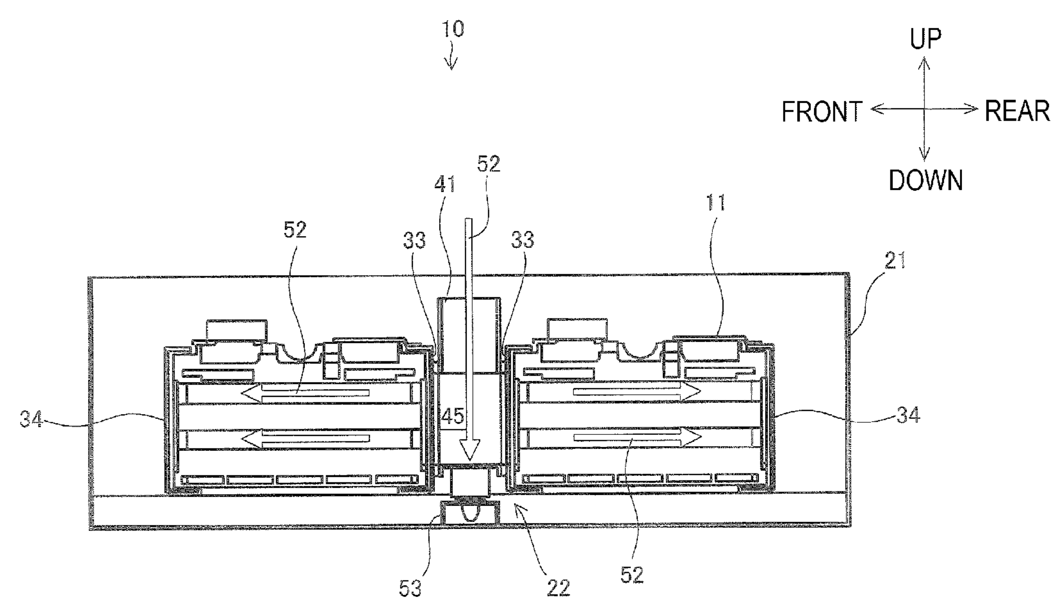
FIG. 5B is a sectional view of the battery modules used in the cooling structure for the battery modules of the embodiment of the disclosure.

FIG. 1 is a perspective view of a vehicle 13 mounted with a battery pack 12 having the cooling structure 10 for the battery modules 11 of the embodiment. FIG. 2 is a perspective view of the battery pack 12 having the cooling structure 10 for the battery modules 11 of the embodiment. FIG. 3 is a perspective view of the battery modules 11 used in the cooling structure 10 for the battery modules 11 of the embodiment. FIG. 4A is a perspective view of a chamber 22 used in the cooling structure 10 for the battery modules 11 of the embodiment. FIG. 4B is a side view of the chamber 22 used in the cooling structure 10 for the battery modules 11 of the embodiment. FIG. 5A is a sectional view of the cooling structure 10 for the battery modules 11 of the embodiment, in a direction of an A-A line of the battery pack 12 illustrated in FIG. 2. FIG. 5B is a sectional view of the cooling structure 10 for the battery modules 11 of the embodiment, in a direction of a B-B line of the battery pack 12 illustrated in FIG. 2.

As illustrated in FIG. 1, the vehicle 13, which is an automobile, a train, or the like, is mounted with the battery pack 12 (refer to FIG. 2) for supplying power to a motor and various electric components. For automobiles that can be used as the vehicle 13, electrical vehicles (EVs), hybrid electrical vehicles (HEVs), plug-in hybrid electrical vehicles (PHEVs), and so on have been spread in recent years.

The battery pack 12 is placed in, for example, a housing space 14 under a rear floor on a rear side of the vehicle 13. The placement position of the battery pack 12 is not limited to the housing space 14 under the rear floor and may be a housing space such as under a front floor on which a driver's seat and a passenger seat of the vehicle 13 are placed. The direction of the contained battery pack 12 can be changed in accordance with a design as desired, depending on the shape of the housing space 14.

As illustrated in FIG. 2, the battery pack 12 mainly includes two sets of battery modules 11, a battery case 21 that houses the battery modules 11, and the chamber 22 that is interposed between the two sets of battery modules 11. The chamber 22 communicates with an intake duct 23 at a top surface of the battery case 21. Although not illustrated, a bus bar being coupled to battery cells 31 (see FIG. 3) that constitute the battery module 11, and so on, are disposed on an upper surface of the battery module 11. The battery module 11 is electrically coupled to electronic equipment such as a battery control unit (BCU) and a junction box, in the battery case 21. Herein, an arrangement direction in which the battery modules 11 of this disclosure are arranged corresponds to the front-rear direction illustrated on the paper.

As illustrated in FIG. 3, the battery module 11 has battery cells 31 that are electrically coupled to one another. The battery cells 31 are fixed at positions in a frame body 32 of the battery module 11 via separators (not illustrated). The battery cell 31 is, for example, a secondary battery, such as a nickel hydrogen battery or a lithium ion battery. Each battery cell 31 has, for example, a rectangular plate shape, and the battery cells 31 are arranged by stacking in the longer direction (right-left direction illustrated on the paper) of the battery module 11. The battery cell 31 is not limited to the above-described nickel hydrogen battery or lithium ion battery and may be an all-solid-state battery or another battery. A stacking direction in which the battery cells 31 of this disclosure are stacked corresponds to the right-left direction illustrated on the paper.

As illustrated in the drawing, a side surface 33 in a longer direction of the frame body 32 includes an intake port 35 for allowing cooling air to flow into the inside of the battery module 11. Meanwhile, a side surface 34 in the longer direction of the frame body 32 includes a discharge port 36 for discharging cooling air to the outside of the battery module 11.

A dash-dot line 30 shows an abutting area in which the side surface 33 abuts on a sealing member 42 (refer to FIG. 4A) of the chamber 22. The intake port 35 is provided within this abutting area of the side surface 33. Although details will be described later, a body 41 (refer to FIG. 4A) of the chamber 22 abuts on the side surfaces 33 via the sealing members 42 to form an internal space 45 (refer to FIG. 4A) of the chamber 22. The area in which the discharge port 36 is provided in the side surface 34 is not specifically limited; but in consideration of discharging properties of cooling air in the battery module 11, the discharge port 36 has approximately the same shape as the intake port 35.

As illustrated in FIG. 4A, the chamber 22 mainly includes the body 41, the sealing members 42 that are provided along openings 41A and 41B of the body 41, reinforcing ribs 43 that are provided in the body 41, and a chamber fixing part 44 (refer to FIG. 4B) for fixing the body 41 to the battery case 21 (refer to FIG. 2) and so on.

The body 41 is an insulating box-shaped body formed of a resin material, such as thermoplastic resin. The body 41 is interposed between the side surfaces 33 of the two sets of battery modules 11 and has the openings 41A and 41B at ends in a shorter direction (front-rear direction illustrated on the paper) of the body 41. In addition, an intake opening 41C for communicating with the intake duct 23 is provided on a top surface 41D of the body 41.

The sealing member 42 is formed of, for example, a flexible rubber material, and it is disposed throughout the entire circumference along each of the openings 41A and 41B of the body 41. The body 41 is placed while being held between the two sets of battery modules 11, whereby the sealing members 42 are tightly fitted to the side surfaces 33 of the frame bodies 32. In this structure, the openings 41A and 41B of the body 41 are sealed by the side surfaces 33, and the internal space 45 of the chamber 22 is formed.

As illustrated in the drawing, the reinforcing ribs 43 are provided in the body 41 such that each of the reinforcing ribs 43 is coupled to the top surface 41D and a bottom surface 41E of the body 41 that are apart from each other in a height direction of the body 41 and extends between the top surface 41D and a bottom surface 41E of the body 41. The reinforcing ribs 43 are provided at three positions of a center part and parts in the vicinity of both ends in a longer direction (right-left direction illustrated on the paper) of the body 41. The reinforcing ribs 43 are provided in the internal space 45 of the body 41 without sealing the body 41 in the shorter direction (front-rear direction illustrated on the paper).

In this structure, the internal space 45 of the body 41 is not sealed by the reinforcing ribs 43 and is in a communication state in the longer direction. Cooling air that flows from the intake opening 41C to the internal space 45 is sent to the whole internal space 45. Although details will be described later, cooling air is sent in a passage having a sufficient cross section, to the whole internal space 45, whereby the cooling air is supplied also to the whole battery modules 11, and the battery cells 31 are uniformly cooled.

As illustrated in FIG. 4B, the reinforcing ribs 43 are formed with the body 41 as an integrated structure, for example, by resin molding. The reinforcing ribs 43 extend to a lower side of the bottom surface 41E of the body 41. A clip 46 that is used as the chamber fixing part 44 is disposed at an end of each of the reinforcing ribs 43. The clip 46 is fixed to the reinforcing rib 43 at one end and is inserted in a mounting hole 54 (refer to FIG. 5A) at the other end. The mounting hole 54 is provided in a bottom surface of the battery case 21 (refer to FIG. 2).

With this structure, the body 41 is fixed to the battery case 21 by inserting the clips 46 in the mounting holes 54. That is, the body 41 can be fixed without performing an operation for fastening it to the battery case 21 by using bolts or the like, whereby a burden on a worker is reduced. In addition, in assembling the body 41, the clips 46 are positioned under the reinforcing ribs 43, and an insertion force is reliably transmitted to the clip 46, resulting in improving workability.

As illustrated in the drawing, the body 41 has the large openings 41A and 41B along the side surfaces 33 of the battery modules 11 and has a shape extending in the longer direction of the battery modules 11. As described above, the body 41 is held between the two sets of battery modules 11, and the sealing members 42 are tightly fitted to the side surfaces 33.

In addition, in the body 41 of the embodiment, the reinforcing ribs 43 are disposed in the longer direction of the body 41. Each of the reinforcing ribs 43 is coupled to the top surface 41D and the bottom surface 41E of the body 41 that are apart from each other in the height direction of the body 41 and extends between the top surface 41D and the bottom surface 41E of the body 41. This structure provides a desired rigidity to the chamber 22. Thus, the chamber 22 is hardly deformed to cause distortion or the like, and sealing properties at the sealing members 42 are prevented from deteriorating, even when vibrations of the vehicle 13 or the like are applied to the battery modules 11 or the chamber 22.

The body 41 is not fixed by fastening it to the side surfaces 33 of the battery modules 11 or other parts with the use of bolts or the like, whereby the number of components is reduced, resulting in reduction in manufacturing cost and in mass of the whole battery pack 12.

As illustrated in FIG. 5A, in the cooling structure 10 for the battery modules 11 of the embodiment, cooling air that flows in the intake duct 23 is sent from the intake opening 41C into the body 41 of the chamber 22, via a blower (not illustrated). The internal space 45 of the chamber 22 is in contact with the side surfaces 33 of the battery modules 11 via the sealing members 42. With this structure, the body 41 has a passage cross section area that is sufficiently large for an air passage, and it communicates with the battery modules 11 on both sides thereof. In this state, as shown by arrows 51, cooling air that is sent to the body 41 is unlikely to receive a great passage resistance and is sent to the whole internal space 45 of the body 41.

Meanwhile, the side surface 33 of the battery module 11 has the intake port 35 within the abutting area in which the side surface 33 abuts on the sealing member 42. Thus, the internal space 45 of the chamber 22 and internal spaces of the battery modules 11 communicate with each other via the openings 41A and 41B (refer to FIG. 4A) and the intake port 35.

Moreover, the chamber 22 does not project to the outside of both ends of the battery modules 11 and is disposed within an area in which the battery modules 11 are placed, in a longer direction (right-left direction illustrated on the paper). This structure prevents the battery pack 12 from increasing in size, prevents manufacturing cost of the battery modules 11 from increasing, and prevents the whole battery pack 12 from increasing in mass.

As illustrated in FIG. 5A, the battery cells 31 are stacked at predetermined spaces via separators in the longer direction of the battery module 11. Cooling air that is sent from the chamber 22 into the internal spaces of the battery modules 11 flows between the battery cells 31 and is then discharged from the discharge ports 36 of the side surfaces 34 of the battery modules 11 to the inside of the battery case 21, as shown by arrows 52.

This structure prevents cooling air from leaking from between the chamber 22 and the battery module 11 to the inside of the battery case 21. Cooling air is supplied as uniform as possible, to the battery cells 31 that are arranged in the vicinity of the ends in the longer direction of the battery modules 11. Thus, local excessive heating of the battery cells 31, which can cause malfunction of the battery modules 11, is prevented.

The chamber 22 is interposed between the two sets of battery modules 11, and cooling air in the chamber 22 is supplied to the two sets of battery modules 11. With this structure, the dimensions of the whole battery pack 12 are reduced, whereby the housing space is easily obtained, and mass of the whole battery pack 12 is reduced.

Furthermore, as illustrated in the drawing, the chamber 22 is fixed to the mounting holes 54 of fixing brackets 53 that are disposed on the bottom surface of the battery case 21, by using the clips 46. Meanwhile, the battery modules 11 are fastened and fixed to fixing brackets 55, at the both ends in the longer direction, for example, by bolts or the like. The fixing brackets 55 are disposed on the bottom surface of the battery case 21. This structure makes the sealing members 42 be pressed between the side surfaces 33 of the battery modules 11 and thereby has sealing properties that are easily kept. Also, the body 41 is supported in a pressed state between the battery modules 11 while being supported also by the reinforcing ribs 43, and therefore, it is hardly deformed by vibrations of the vehicle 13, or the like.

Although a case of forming the chamber 22 and the intake duct 23 as separated bodies and assembling them together so as to communicate with each other is described in the embodiment, the components are not limited thereto. For example, the chamber 22 may be integrally formed with the intake duct 23 into one body, as a part of the intake duct 23. The chamber 22 has a shape with a passage cross section that is greater than that of the intake duct 23, whereby cooling air that flows in the chamber 22 is straightened and is supplied to the whole battery modules 11 as uniform as possible. Various other modifications and alterations can be made without departing from the gist of the disclosure.

In the cooling structure for the battery modules of the embodiment of the disclosure, the chamber is interposed between the adjacent battery modules and is held therebetween via the sealing members while communicating therewith. The reinforcing ribs are provided in the internal space of the body of the chamber. With this structure, the body of the chamber has a desired rigidity due to the reinforcing ribs and is hardly deformed even when receiving vibrations of the vehicle, or the like, and sealing properties of the body of the chamber that is used as an air passage, is improved. In addition, it is possible to supply cooling air to the two sets of battery modules via the one chamber, whereby the number of components is decreased, and manufacturing cost and mass of the whole battery pack are reduced. Moreover, the chamber is fixed without an operation for fastening it to the battery modules, which decreases the number of components and facilitates the assembling operation of the chamber.

The invention claimed is:

1. A battery pack comprising:

battery modules comprising battery cells;

an intake duct configured to allow cooling air to flow to the battery modules; and a chamber communicating with the intake duct, the chamber being interposed between the battery modules that are adjacent to each other, wherein the chamber comprises:

a body having a box shape, the body comprising openings respectively at both ends in an arrangement direction in which the battery modules are arranged, the body communicating with each of the battery modules;

sealing members each of which is disposed at a coupling area at which the body and a corresponding one of the battery modules are coupled to each other; and a reinforcing rib provided in an internal space of the body, the reinforcing rib being coupled to first and second parts of the body that are apart from each other in a height direction of the body, the reinforcing rib extending between the first and second parts of the body, wherein the body is supported in a state of being held between the battery modules, and wherein the cooling air is sent to the battery modules via the chamber, wherein the battery modules and the chamber are contained in a battery case, wherein a chamber fixing part is provided under the reinforcing rib, and wherein the chamber fixing part comprises a clip configured to be removably inserted into a mounting hole provided in the battery case.

2. The battery pack according to claim 1, comprising reinforcing ribs including the reinforcing rib, wherein the reinforcing ribs are provided at positions in the internal space of the body, coupled to first and second parts of the body, and extending between the first and second parts of the body, and the internal space of the body is a continuous space that is not divided by the reinforcing ribs.

3. The battery pack according to claim 1, wherein the chamber includes the body having the box shape and is formed of an insulating resin material, the body comprising openings respectively at both ends in the arrangement direction in which the battery modules are arranged, and an intake opening on a top surface of the body, the intake opening communicating with the intake duct, the body communicating with each of the battery modules, and wherein the reinforcing rib is integrally formed with the body and provided in an internal space of the body.

4. The battery pack according to claim 1, wherein the sealing members are each formed of a flexible rubber material and are disposed throughout an entire circumference along a respective one of the openings of the body.

5. The battery pack according to claim 3, wherein the first and second parts of the body comprise the top surface of the body and a bottom surface of the body, respectively, the reinforcing rib extending between the top surface and the bottom surface.

6. The battery pack according to claim 5, wherein the reinforcing rib extends beyond the bottom surface of the body to a lower side of the bottom surface.

7. The battery pack according to claim 1, further comprising a plurality of reinforcing ribs including the reinforcing rib, wherein the plurality of reinforcing ribs are arranged in a longer direction of the body.

8. The battery pack according to claim 7, wherein the plurality of reinforcing ribs are provided at a center part and at parts in a vicinity of both ends of the body in the longer direction.

9. The battery pack according to claim 8, wherein each of the battery modules comprises a frame body, and each of the battery modules has an intake port provided on a side surface of the frame body in a longer direction of the battery module, the intake port being within an abutting area in which the side surface abuts on a corresponding one of the sealing members.

10. The battery pack according to claim 9, wherein each of the battery modules further comprises a discharge port provided on an opposite side surface of the frame body in the longer direction of the battery module, the cooling air flowing through each of the battery modules from the intake port and being discharged from the discharge port.

11. The battery pack according to claim 10, wherein each discharge port has approximately a same shape as the intake port.

12. The battery pack according to claim 1, wherein the battery cells are rectangular plate-shaped battery cells arranged by stacking in a longer direction of each of the battery modules, and the battery cells are spaced from one another via separators.

13. The battery pack according to claim 1, wherein the battery cells are secondary batteries.

14. The battery pack according to claim 1, wherein the chamber is disposed within an area in which the battery modules are placed in a longer direction of the battery modules such that the chamber does not project beyond both ends of the battery modules in the longer direction.

15. The battery pack according to claim 14, wherein the battery modules are fixed to fixing brackets disposed on a bottom surface of the battery case at both ends of the battery modules in the longer direction.

16. The battery pack according to claim 1, wherein a passage cross-sectional area of the internal space of the body is greater than a passage cross-sectional area of the intake duct, such that the cooling air flowing into the internal space from the intake duct is straightened and supplied uniformly to the battery modules.

17. The battery pack according to claim 1, wherein the chamber and the intake duct are integrally formed with each other as a single unit, the chamber being a part of the intake duct.

18. The battery pack according to claim 1, wherein the battery pack is mounted in a vehicle, and the intake duct communicating with an exterior of the battery pack at a top surface of the battery case.

19. The battery pack according to claim 1, further comprising a blower configured to send the cooling air through the intake duct and into the chamber via the intake opening.

* * * * *